United States Patent [19]

Goodall

[11] Patent Number: 4,520,163

[45] Date of Patent: May 28, 1985

[54] PROCESS OF SEQUENTIALLY COPOLYMERIZING PROPYLENE-ETHYLENE COPOLYMERS AND CATALYST THEREFOR

[75] Inventor: Brian L. Goodall, Houston, Tex.

[73] Assignee: Shell Oil Company, Houston, Tex.

[21] Appl. No.: 569,366

[22] Filed: Jan. 9, 1984

[51] Int. Cl.$^3$ .......................................... C08F 297/08
[52] U.S. Cl. ...................... 525/53; 525/247; 525/268; 525/323
[58] Field of Search .................. 525/247, 268, 323, 53

[56] References Cited

U.S. PATENT DOCUMENTS

| | | | |
|---|---|---|---|
| 3,200,173 | 8/1965 | Schilling | 260/878 |
| 3,318,976 | 5/1967 | Short | 260/878 |
| 3,514,501 | 5/1970 | Leibson et al. | 260/878 |
| 4,284,738 | 8/1981 | Zukowski | 525/247 |
| 4,334,041 | 6/1982 | Zukowski | 525/53 |
| 4,380,608 | 4/1983 | Hasuo et al. | 525/53 |

FOREIGN PATENT DOCUMENTS 0037291  7/1981  European Pat. Off. .

*Primary Examiner*—Wilbert J. Briggs, Sr.
*Attorney, Agent, or Firm*—Dean F. Vance

[57] ABSTRACT

A process for the preparation of ethylene-propylene impact copolymers at improved catalyst productivity rates involving the formation of a propylene prepolymer by polymerization of propylene in liquid phase in the presence of a catalyst system containing titanium halide supported on magnesium halide and aluminum alkyl complexed with an electron donor. Ethylene and propylene are block polymerized onto the prepolymer in a vapor phase reaction zone in the presence of further added quantities of aluminum alkyl components.

11 Claims, 2 Drawing Figures

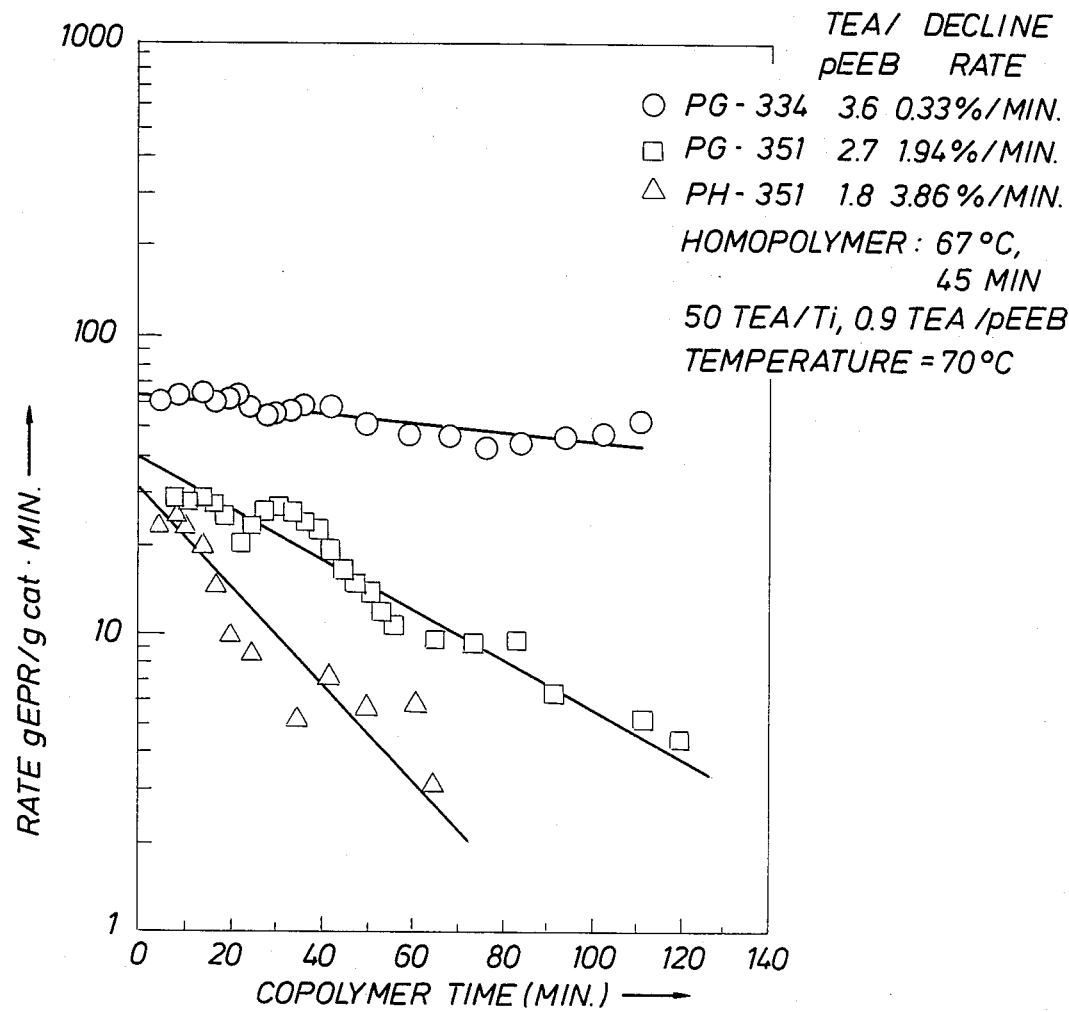
FIG. 1 EFFECT OF TEA/pEEB ON COPOLYMER DEACTIVATION RATE
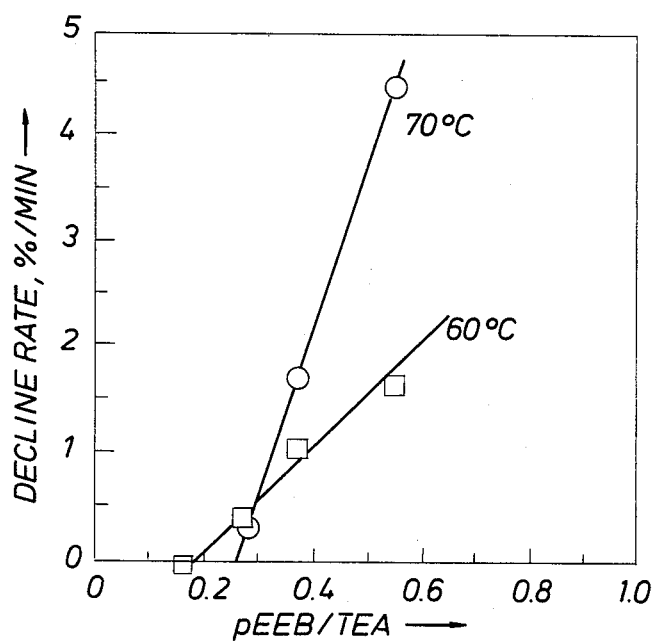
FIG. 2 COPOLYMER DEACTIVATION AS A FUNCTION OF TEA/pEEB

PROCESS OF SEQUENTIALLY COPOLYMERIZING PROPYLENE-ETHYLENE COPOLYMERS AND CATALYST THEREFOR

BACKGROUND OF THE INVENTION

1. Field of the Invention

This invention relates to a catalyst and process for preparing impact-modified propylene polymers. More particularly, the invention relates to a catalyst and process for making impact-improved, sequentially polymerized propylene-ethylene copolymers at high efficiencies and high yields.

2. Description of the Prior Art

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, "Toughened Plastics" by C. B. Bucknall, Applied Science Publishers Ltd. 1977, pp. 87–90, and T. G. Heggs in *Block Copolymers*, D. C. Allport and W. H. James (eds), Applied Science Publishers Ltd. 1973, chapter 4. Representative U.S. patents describing such methods are: U.S. Pat. Nos. 3,200,173—Schilling; 3,318,976—Short; and 3,514,501—Leibson et al.

As disclosed in U.S. Pat. No. 3,514,501, a propylene polymer preblock is prepared, preferably in the liquid phase, by catalytic polymerization of propylene in a hydrocarbon diluent such as liquid propylene to form a slurry. After a separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past, the conventional catalyst system used in such a polymerization process has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula $n.TiCl_3AlCl_3$ activated with diethylaluminum chloride or triethyl aluminum. The cocrystallized titanium trichloride-aluminum trichloride can have been subjected to a modification treatment with a suitable electron donor compound to increase its activity or stereospecificity. Such compounds include phosphorus compounds, esters of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. These olefin polymerization catalysts are prepared by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. The catalyst systems of this type which have been disclosed in the prior art generally are able to produce olefin polymers in high yield and, in the case of catalysts for polymerization of propylene or higher alpha-olefine, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-para-methoxybenzoate (ethyl anisate) or methyl-p-toluate.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, provided that the polymerization reaction is carried out in a liquid diluent, e.g., liquid propylene monomer. However, in the vapor phase polymerization used in preparing the EP copolymer block of P-EP block copolymer described above, using conventional operating conditions, it has been found that the rapid catalyst deactivation left insufficient catalyst activity in the gas-phase copolymerization reactors.

One means to improve the activity in the copolymerization is disclosed in U.S. Pat. No. 4,284,738. In the '738 patent, vapor phase polymerization is conducted in the presence of further added quantities of aluminum trialkyl catalyst components amounting from about 5 to about 50% of the quantity used in the preparation of the propylene prepolymer. Increases in ethylene incorporation as well as in impact strength of the product are achieved by this process improvement. However, there are still some problems connected with the aforementioned process in that process control is somewhat difficult to maintain. For instance, heating and cooling requirements in the vapor phase reaction zone fluctuate considerably, and if not constantly monitored, can cause unwanted variations in polymerization temperature, productivity, and product quality. It sometimes results in a "sticky" polymer product with attending materials handling problems.

Another approach is disclosed in U.S. Pat. No. 4,334,041. In the '041 patent, additional quantities of supported titanium halide catalyst component are added to the vapor phase reaction zone and the alkyl aluminum catalyst compound added to the vapor phase reaction zone is at least partially complexed with an electron donor compound at a mole ratio of alkyl aluminum to electron donor within a very narrow range and different from that used in the prepolymer preparation. It is also important in the patent that the temperatures of each of the zones be controlled within rather narrow limits or the extent of the above described improvements will be less or even completely counteractive.

A new process has now been found that results in high yields of impact copolymers without the problems associated with the '738 and '041 processes.

SUMMARY OF THE INVENTION

The present invention relates to a process for making impact-improved, sequentially polymerized propylene-ethylene copolymers with a high activity catalyst. In particular, the present invention is an improvement in the process for preparing impact resistant ethylene-propylene polymers having high impact properties combined with high stiffness, which process comprises:

(a) preparing a propylene prepolymer by polymerizing propylene in the presence of a catalyst system comprising:
  (i) a highly active solid catalyst component comprising titanium tetrachloride, magnesium chloride, and an electron donor,
  (ii) as cocatalyst a compound $AlR_3$ where R represents an alkyl group of from 2 to 8 carbon atoms, and
  (iii) a selectivity control agent which may be partly or totally complexed with the catalyst;
(b) separating the propylene prepolymer from volatile constituents; and
(c) introducing said separated propylene prepolymer, ethylene monomer and propylene monomer into at least one vapor phase reaction zone;

wherein the improvement comprises adding an additional amount of said cocatalyst into said vapor phase reaction zone, wherein the additional amount of cocatalyst added to said vapor phase reaction zone is between tow (2) and ten (10) times the amount of cocatalyst employed in step (a).

As shown in the examples which follow, addition of sufficient quantities of extra co-catalyst allow a high enough rate of rubber manufacture, endowing the resulting products with excellent impact properties.

BRIEF DESCRIPTION OF THE DRAWING

FIG. 1 is a plot of activity decline over time as a function of total cocatalyst to selectivity control agent molar ratio.

FIG. 2 is a plot of activity decline as a function of selectivity control agent to cocatalyst ratio at two temperatures.

DETAILED DESCRIPTION OF THE INVENTION

The procatalysts which are employed in this invention may be produced by methods known in the art. These procatalysts are any one of the recently developed, high activity magnesium halide supported catalyst components disclosed e.g., in U.S. Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

A preferred procatalyst may be prepared by reacting a magnesium alkoxide, suitably magnesium diethoxide, with titanium tetrachloride in the presence of or with subsequent addition of an aromatic ester electron donor, preferably in the presence of and/or with subsequent treatment with a halohydrocarbon liquid, to produce a composition of combined tetravalent titanium chloride compounds, magnesium chloride and the electron donor, and further treating the resulting solid at an elevated temperature with titanium tetrachloride in one or more contacts. These procatalysts have the general formula

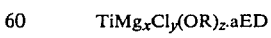

$$TiMg_xCl_y(OR)_z \cdot aED$$

wherein R is an alkyl group of 2-8 carbon atoms or an aryl, alkaryl, or aralkyl group of 6 to 20 carbon atoms, preferably ethyl; ED is an electron donor, preferably an aromatic ester;
$x = 5–40$ and preferably 9–20;
$y = 10–100$ and preferably 20–40;
$z = 0.02–1.0$ and preferably 0.05–0.5; and a=0.5–10 and preferably 0.6–3.5.

A variety of electron donor compounds, disclosed in the prior art as useful in the preparation of supported coordination procatalysts may be employed as compound ED. Esters are preferred; aromatic esters are most preferred. Very good procatalysts can be made using ethyl benzoate, p-ethyl toluate or ethyl-p-methoxybenzoate as compound ED.

Cocatalysts used as component (b) with procatalysts treated according to this invention are trialkyl aluminum compounds $AlR'_3$ wherein R' is an alkyl group of 2 to 8 carbon atoms, preferably ethyl. They may be complexed in whole or in part with a selectivity control agent.

A variety of electron donor compounds, disclosed in the prior art for use as selectivity control agents, may be employed as catalyst component (c). Preferred are esters of aromatic carboxylic acids, which may be complexed in whole or in part with the cocatalyst. Preferred selectivity control agents are ethyl-p-methoxybenzoate and ethyl-p-ethoxybenzoate. Examples of other preferred esters suitable as selectivity control agents are methyl- and ethylbenzoate, methyl-p-methoxybenzoate and methyl- and ethyl-p-toluate.

Polymerization of propylene in the first step is conducted in a liquid system with an inert diluent such as a paraffinic liquid of 3 to 15 carbon atoms per molecule, or in a liquid system containing propylene as sole diluent or together with a small amount of propane. Propylene polymerization in liquid phase is conducted at temperatures of 50° to 80° C. and at a pressure sufficient to maintain liquid conditions.

In a continuous reaction system, the liquid in the reaction zone is maintained at reaction conditions, monomer is continuously charged to the reaction zone, catalyst components are also charged continuously or at frequent intervals to the reaction zone, and reaction mixture which contains polymer is withdrawn from the reaction zone continuously or at frequent intervals; polymer product is recovered from the withdrawn reaction mixture.

In propylene polymerization, the reaction mixture is typically maintained at conditions at which the polymer is produced as a slurry of powder in the reaction mixture. The catalyst systems of this invention are extremely active and highly stereoselective in propylene polymerization, so that no removal of catalyst components or of atactic polymer from the polymer product is required.

While the catalysts of this invention are particularly adapted for use in continuous polymerization systems, they may, of course, also be employed in batch polymerization. This may be of advantage in multistage polymerization, in which propylene polymers and propylene-ethylene polymers are produced in separate reaction zones arranged in sequence.

In batch reactions, it is generally preferred to first introduce monomer and then cocatalyst and selectivity control agent into the reaction zone and then add the procatalyst last.

The total amount of aluminum alkyl compounds in the first polymerization reaction mixture is generally in the range from about 10 to about 200 moles per atom of titanium in the procatalyst and in most cases preferably between about 30 and 130.

Differently prepared procatalysts vary in the Al:Ti ratio required for best results, as will be known to persons familiar with this type of catalyst. In general, activity is greater at higher Al:Ti ratios, but this results in higher aluminum residues of the undeashed polymer, which is undesirable; it also tends to increase the requirement of selectivity control agent in order to maintain the desired degree of isotacticity of the product, and the selectivity control agent generally also has the effect of reducing catalyst activity. The desired balance of concentration of catalyst components is readily determined by experiment.

The molar ratio of aluminum to selectivity control agent is suitably in the range from 0.5:1 to 25:1, preferably from 0.75:1 to 4:1.

It is well known that supported coordination procatalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The monomer feed to Ti metal weight ratio in the first stage liquid phase polymerization is usually about 2 to 3 kg propylene per mg Ti for batch operation or between 1 to 2 kg propylene per mg Ti for continuous operation.

The prepolymer from the reaction zone is taken to a separation zone, such as a cyclone or a bag filter, wherein the volatile constituents are separated from the polymer and processed according to known techniques and recycled to the reaction zone, the amount of volatiles removed being sufficient so that less than 10% and preferably no more than 5% volatile content remains in the prepolymer.

In the vapor phase block polymerization, the polymer recovered from the separation zone and containing active catalyst residues, is taken to a vapor phase reaction zone having provisions for introducing additional quantity of alkyl aluminum, ethylene monomer and propylene monomer at one or more points in the zone (and inert gasses such as nitrogen) so that the active catalyst residues in the prepolymer and the added catalyst components cause said monomers to polymerize to a block thereby modifying the ultimate properties of the resin produced. The polymerization in the vapor phase reaction zone is carried out at pressures lower than those used for the prepolymer preparation, i.e., pressures of about 10 to about 300 psig. Polymerization temperatures should range from about 40° C. to about 100° C., and preferably from about 60° C. to about 80° C.

The ethylene and propylene monomers do not require premixing prior to introduction into the vapor phase zone; in fact, it is sometimes more advantageous to separately introduce each of the monomers at one or more points along the reaction length.

The molar ratio of ethylene to propylene monomer introduced to the vapor phase reaction zone is typically about 0.5:1 to about 2:1, preferably about 0.75:1 to about 1.25:1.

An important aspect of the present invention is the relative amount of additional cocatalyst added to the vapor phase reaction zone. It is essential that the amount of trialkyl aluminum cocatalyst added to the vapor phase reaction zone be between two (2) and 10 times the amount of cocatalyst employed in the first stage, liquid phase polymerization of propylene. Preferred amounts are between 2.5 and 6 times the amount of cocatalyst.

The amount of cocatalyst employed in the first stage liquid phase polymerization may also be expressed as a molar ratio of cocatalyst to selectivity control agent. This ratio is, of course, dependent upon the particular cocatalyst employed. For example, with ethyl-p-methoxybenzoate, the molar ratio of cocatalyst to SCA is typically 2:1 to 4:1, while with ethyl-p-ethoxybenzoate, the molar ratio of cocatalyst to SCA is typically about 0.9:1 to about 2.5:1. Accordingly, the absolute amount of cocatalyst added in the second stage vapor phase reaction zone will also vary with the particular SCA employed. But in any case, the relative amount of cocatalyst added in the second stage will be at least two times the amount employed in the first stage.

Generally from about 10 to about 30 percent by weight of block based on the weight of the total polymer is produced in the total block polymerization reactor system.

aluminum cocatalyst (TEA) and a para-ethoxy-ethyl-benzoate selectivity control agent (PEEB). In each case a "standard" liquid propylene homopolymer run (45 min., 67° C., TEA/pEEB molar ratio 0.9:1) was followed by a copolymerization run at 35 psig, 60° C. (180 min., 50% mol propylene, 45% mol ethylene, 5% mol propane). In each case the catalyst was "rejuvenated" by adding extra TEA prior to the copolymerization run. In run PI-88 only a little TEA was added (final TEA/pEEB ratio 1.8) while in run PH-332 a large amount of TEA was used (final TEA/pEEB ratio 6.0). Comparing the two runs reveals that a low TEA/PEEB ratio of 1.8 ("light rejuvenation") gives a low initial rate and a rapid activity decline ($\geq 1\%$ per minute). At a high ratio (run PH-332, 6.0), i.e., "heavy rejuvenation", a high initial rate is accompanied by a minimal rate of activity decline ($\sim 0.1\%$ per minute). When the catalyst is not rejuvenated at all then the copolymerization rate is virtually zero (run PI-122).

The results are presented below in Table 1.

TABLE 1

EFFECT OF CATALYST REJUVENATION (TEA/pEEB RATIO)
Homopolymerization 45 min, 67° C., TEA/pEEB 0.9:1
Copolymerization 180 min, 60° C.
35 psig ~50% $mC_3^=$
~45% $mC_2^=$

| Run # | Final TEA/pEEB mol. ratio | Molar ratio, TEA used in co-polymerization to TEA in homopolymerization | COPOLYMER PRODUCED, GMS RELATIVE RATE* | | | | | Catalyst Productivity, kg copolymer/g cat/h | | | Ec** Calc. | % w IR. | Fc*** % w | Polymer Yield Kg/g cat |
|---|---|---|---|---|---|---|---|---|---|---|---|---|---|---|
| | | | Hour 1 | Hour 2 | Hour 3 | Hour 2 | Hour 3 | Hour 1 | Hour 2 | Hour 3 | | | | |
| PI-122 | 0.9 | 0 | Negligeable | | | — | — | — | — | — | 50.3 | — | 1.2 | 21.8 |
| PI-88 | 1.8 | 1.0 | 9.8 | 3.2 | 2.7 | 33% | 28% | 0.6 | 0.2 | 0.2 | 62.6 | — | 5.9 | 17.6 |
| PI-85 | 2.7 | 2.0 | 30.1 | 23.7 | 20.2 | 79% | 67% | 1.9 | 1.5 | 1.3 | 68.3 | 62.2 | 17.2 | 20.5 |
| PI-89 | 3.6 | 3.0 | 28.7 | 22.3 | 18.3 | 78% | 64% | 1.9 | 1.4 | 1.2 | 60.3 | 54.1 | 19.1 | 21.8 |
| PI-93 | | | 29.4 | 28.1 | 22.5 | 96% | 77% | 1.9 | 1.8 | 1.5 | 64.0 | 59.4 | 23.9 | 22.1 |
| PG-332 | 4.0 | 3.44 | 48.6 | 51.6 | 47.3 | 106% | 97% | 3.1 | 3.3 | 3.1 | 60.0 | 71.4 | 23.8 | 25.1 |
| PH-332 | 6.0 | 5.67 | 51.8 | 56.3 | 47.2 | 109% | 91% | 3.3 | 3.6 | 3.1 | 65.7 | 70.3 | 30.3 | 28.3 |

*Relative Rate - Productivity as percentage of first hour productivity.
**Ethylene content of rubber calc = calculated from process as chromatograph
I.R. = infra-red (Grimsby-Short) determination.
***Rubber content of product (i.e., fraction of ethylene-propylene copolymer in total composition).

The vapor phase reaction zone may be a continuously agitated reaction zone such as that disclosed in U.S. Pat. No. 3,514,501, a fluidized bed reaction zone, such as that disclosed in U.S. Pat. No. 4,379,759, or one or more pipe line reactors in series with optional jacketing for heat removal and suitable monomer introduction points as well as agitating means.

The following examples illustrate the invention.

EXAMPLES

The Procatalysts

In the following examples, the procatalysts were compositions of tetravalent titanium, magnesium, chlorine, ethoxy groups and ethyl benzoate. They were prepared by reacting magnesium ethoxide, titanium tetrachloride and ethyl benzoate (EB) in the presence of a halohydrocarbon at elevated temperatures to produce a solid containing Mg, Cl, Ti, —OEt groups and EB, contacting this solid with $TiCl_4$ at elevated temperatures in two or three additional contacting steps, and completely washing off unbound $TiCl_4$ by washes with a paraffinic liquid. The resulting solids were highly active and selective procatalysts in propylene polymerization.

EXAMPLE 1

In Example 1, several copolymerizations were run with standard procatalyst (described above), triethyl

EXAMPLE 2

In Example 2, additional polymerizations were performed at varying copolymerization temperatures and TEA ratios. In all cases, following a 45 minute liquid phase homopolymerization at 67° C., 50 TEA/Ti and 0.9 TEA pEEB, the reactor was depressured and a 42% ethylene-55% propylene-3% propane mixture was introduced at 35 psig. TEA was added in various concentrations and copolymer runs were made at 60° and 70° C. The activity decline occurring at 70° C. as a function of TEA/pEEB ratio is shown in FIG. 1. At 3.6 TEA/pEEB (3:1 TEA in 2nd stage to TEA in 1st stage) decline rate is only 0.33%/min. but it is almost 6 times that at 2.7 TEA/pEEB (2:1 TEA/TEA ratio).

The decline rate is shown to vary directly with the pEEB/TEA ratio in FIG. 2. As would be expected, decline is greater at 70° C. than 60° C. and the difference definitely increases at high pEEB/TEA ratios. The data indicate that at a 3.6 TEA/pEEB ratio little if any decline would occur. This ratio corresponds to a ratio of TEA in vapor phase copolymerization to TEA in homopolymerization of greater than about 3:1.

EXAMPLE 3

Example 1 was repeated except (a) the copolymerization was run at 70° C. (instead of 60° C.); and (b) various alkylaluminums were added as "rejuvenants". The results are presented below in Table 2.

TABLE 2

| Run # | Alkylaluminum used as "rejuvenant" | Final aluminum/ pEEB ratio | Molar ratio of aluminum used in copolymerization to TEA in homo- polymerization | Ec % W calc | Fc % W calc | Gardner Impact Strength in. lb. | Flexural Modulus psi | Polymer Yield Kg/g cat |
|---|---|---|---|---|---|---|---|---|
| PI-125 | TEA | 3.6 | 3 | 66.3 | 19.8 | 267 | 149,000 | 28.0 |
| PI-123 | TIBAL | 3.6 | 3 | 62.1 | 15.8 | 128 | 156,000 | 26.1 |
| PI-127 | DEAC | 3.6 | 3 | 69.1 | 3.0 | 5 | 184,000 | 21.5 |
| PI-124 | TIBAL | 2.7 | 2 | 85.6 | 6.0 | 6 | 188,000 | 26.1 |

TIBAL = triisobutyl aluminum
DEAC = diethylaluminum chloride
TEA = triethylaluminum These examples serve to demonstrate that while trialkylaluminums (such as TEA and TIBAL) in the appropriate amounts are suitable rejuvenants, dialkylaluminum halides (such as DEAC) are not.

Furthermore the examples demonstrate that inadequate rejuvenation (PI-127, PI-124) gives low rubber make (Fc) and very poor impact properties.

What is claimed is:

1. In the process for preparing impact resistant ethylene-propylene polymers having high impact properties combined with high stiffness, which process comprises:
    (a) preparing a propylene prepolymer by polymerizing propylene in a liquid phase reaction zone in the presence of a catalyst system comprising:
        (i) a highly active solid catalyst component comprising titanium tetrachloride, magnesium chloride, and an electron donor,
        (ii) as cocatalyst a compound $AlR_3$ where R represents an alkyl group of from 2 to 8 carbon atoms, and
        (iii) a selectivity control agent which may be partly or totally complexed with cocatalyst;
    (b) separating the propylene prepolymer from volatile constituents; and
    (c) introducing said separated propylene prepolymer, ethylene monomer and propylene monomer into at least one vapor phase reaction zone; the improvement wherein an additional amount of said cocatalyst is introduced into said vapor phase reaction zone, wherein the additional amount of cocatalyst added to said vapor phase reaction zone is between two (2) and ten (10) times the amount of cocatalyst employed in step (a).

2. The process of claim 1 wherein said cocatalyst is triethyl aluminum.

3. The process of claim 1 wherein the molar ratio of cocatalyst added in said vapor phase reaction zone to cocatalyst added in said liquid phase reaction zone is between 2.5 and 6.

4. The process of claim 1 wherein said selectivity control agent is an ester of an aromatic carboxylic acid.

5. The process of claim 4 wherein said selectivity control agent is selected from the group consisting of ethyl-p-methoxybenzoate and ethyl-p-ethoxybenzoate.

6. The process of claim 1 wherein said electron donor is an aromatic ester.

7. The process of claim 6 wherein said electron donor is selected from the group consisting of ethyl benzoate, p-ethyl toluate and ethyl-p-methoxybenzoate.

8. The process of claim 1 wherein said solid component has the general formula

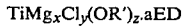

wherein R' is an alkyl group of 2–8 carbon atoms or an aryl, alkaryl, or aralkyl group of 6 to 20 carbon atoms, ED is an aromatic ester;
    x = 5–40;
    y = 10–100;
    z = 0.02–1.0; and
    a = 0.5–10.

9. The process according to claim 1 wherein the molar ratio of total cocatalyst to selectivity control agent is between 0.5:1 to 25:1.

10. The process according to claim 9 wherein the ratio of cocatalyst to selectivity control agent is between 0.75:1 to 4:1.

11. The process according to claim 1 wherein the amount of selectivity control agent employed in step (a) is selected to maintain the desired degree of isotacticity of the propylene prepolymer.

* * * * *